United States Patent [19]

Mukaeda

[11] Patent Number: 4,466,250
[45] Date of Patent: Aug. 21, 1984

[54] AIR PASSAGEWAY TO AIR INJECTION VALVE FOR GAS TURBINE ENGINE

[75] Inventor: Satoshi Mukaeda, Yokosuka, Japan

[73] Assignee: Nissan Motor Company, Limited, Kanagawa, Japan

[21] Appl. No.: 343,815

[22] Filed: Jan. 29, 1982

[30] Foreign Application Priority Data

Feb. 3, 1981 [JP] Japan .................................. 56-13763

[51] Int. Cl.³ .......................... F02C 7/22; F23D 11/44
[52] U.S. Cl. ........................................ 60/737; 60/740; 60/39.23; 431/242
[58] Field of Search .................. 60/736, 740, 741, 748, 60/758, 759, 722, 737, 39.511, 39.36, 39.23, 39.29, 752, 753, 754; 431/164, 166, 167, 188, 242, 243, 350, 351

[56] References Cited

U.S. PATENT DOCUMENTS

| 710,130 | 9/1902 | Weiss | 60/752 |
|---|---|---|---|
| 1,344,438 | 6/1920 | Buell et al. | 431/166 |
| 2,404,335 | 7/1946 | Whittle | 60/748 |
| 3,086,361 | 4/1963 | Howland et al. | 60/736 |
| 3,088,279 | 5/1963 | Dredrich | 60/39.36 |
| 3,121,996 | 2/1964 | Smith . | |
| 3,932,988 | 1/1976 | Beaufrere | 60/39.36 |
| 4,081,957 | 4/1978 | Cox, Jr. | 60/737 |
| 4,088,437 | 5/1978 | Holzapfel | 60/758 |
| 4,105,163 | 8/1978 | Davis et al. | 60/748 |
| 4,246,757 | 1/1981 | Heberling . | |
| 4,262,482 | 4/1981 | Roffe et al. | 60/736 |
| 4,297,842 | 11/1981 | Gerhold et al. | 60/760 |

FOREIGN PATENT DOCUMENTS

| 2930055 | 2/1981 | Fed. Rep. of Germany . | |
| 619251 | 3/1949 | United Kingdom | 60/758 |

*Primary Examiner*—Carlton R. Croyle
*Assistant Examiner*—Timothy S. Thorpe
*Attorney, Agent, or Firm*—Lowe, King, Price & Becker

[57] ABSTRACT

A gas turbine engine in which the air compressed by a compressor provided therein is injected into a combustion chamber provided therein through an air injection valve after passing through a first air passageway formed integrally with the main housing and a second air passageway formed integrally with the combustion chamber housing. One end of the first air passageway is formed into a funnel shape, so that the air compressed by the compressor can efficiently enter the first air passageway. Since the air flowing through the air passageway according to the present invention is heated while passing along the combustion chamber, it is possible to enhance the combustion efficiency.

9 Claims, 5 Drawing Figures

AIR PASSAGEWAY TO AIR INJECTION VALVE FOR GAS TURBINE ENGINE

BACKGROUND OF THE INVENTION

1. Field of the Invention

The present invention relates generally to an air passageway leading to an air injection valve for a gas turbine engine, to supply compressed air into a combustion chamber thereof to atomize fuel supplied to the engine.

2. Description of the Prior Art

The background of the present invention will be explained with respect to the arrangement of an air passageway communicating with an air injection valve installed in a gas turbine engine.

In a gas turbine engine, fuel supplied into a combustion chamber must be atomized through an air injection valve. Therefore, the air compressed by a compressor provided within the gas turbine engine is conducted to the air injection valve via an air passageway communicating between the compressor the air injection valve.

In prior-art gas turbine engines, however, a pipe located outside the engine defines conducting the air passageway to conduct the air compressed by the compressor to the air injection valve.

Accordingly, there exist a number of shortcomings. The basic problems are:

(1) Since the diameter of the pipe used as the air passageway is restricted due to the layout of other apparatus, it is impossible to provide a high-efficiency air supply passageway by increasing the inner diameter of the pipe to decrease the air flow velocity, that is, to reduce the kinetic energy loss within the pipe. As a result, in some cases, installation of an additional pressure source is necessary, especially when the engine is started.

(2) Since the air passageway is arranged outside the gas turbine engine, the air within the air passageway pipe is readily cooled, resulting in reduced combustion efficiency.

(3) Since the air is supplied to the air injection valve via an air inlet pipe and an air supply pipe, material and manufacturing cost for the pipes result in a higher cost for the gas turbine engine, including the additional cost of connectors and nuts used therewith.

The arrangement of a sample prior-art air passageway communicating with an air injection valve for a gas turbine engine will be described in more detail hereinafter with reference to the attached drawings under DETAILED DESCRIPTION OF THE PREFERRED EMBODIMENTS.

SUMMARY OF THE INVENTION

With these problems in mind, therefore, it is a primary object of the present invention is to provide an air passageway leading to an air injection valve for a gas turbine engine of larger inner diameter and shorter length, having a lower kinetic energy loss to provide higher combustion efficiency, while reducing the material and manufacturing costs.

To achieve the above mentioned objects, the air passageway communicating with an air injection valve for a gas turbine engine according to the present invention is formed integrally with the main housing and the combustion chamber housing of a gas turbine engine.

The air passageway according to the present invention is manufactured by the steps of core casting at the same time the main housing and the combustion chamber housing are cast.

BRIEF DESCRIPTION OF THE DRAWINGS

The features and advantages of the air passageway communicating with an air injection valve for a gas turbine engine according to the present invention will be more clearly appreciated from the following description take in conjunction with the accompanying drawings in which like reference numerals designate corresponding elements and in which.

DETAILED DESCRIPTION OF THE PREFERRED EMBODIMENTS

To facilitate understanding of the present invention, a brief reference will be made to a priot-art arrangement of the air passageway communicating with an air injection valve for a gas turbine engine, with reference to the attached drawings.

Figure 1A:
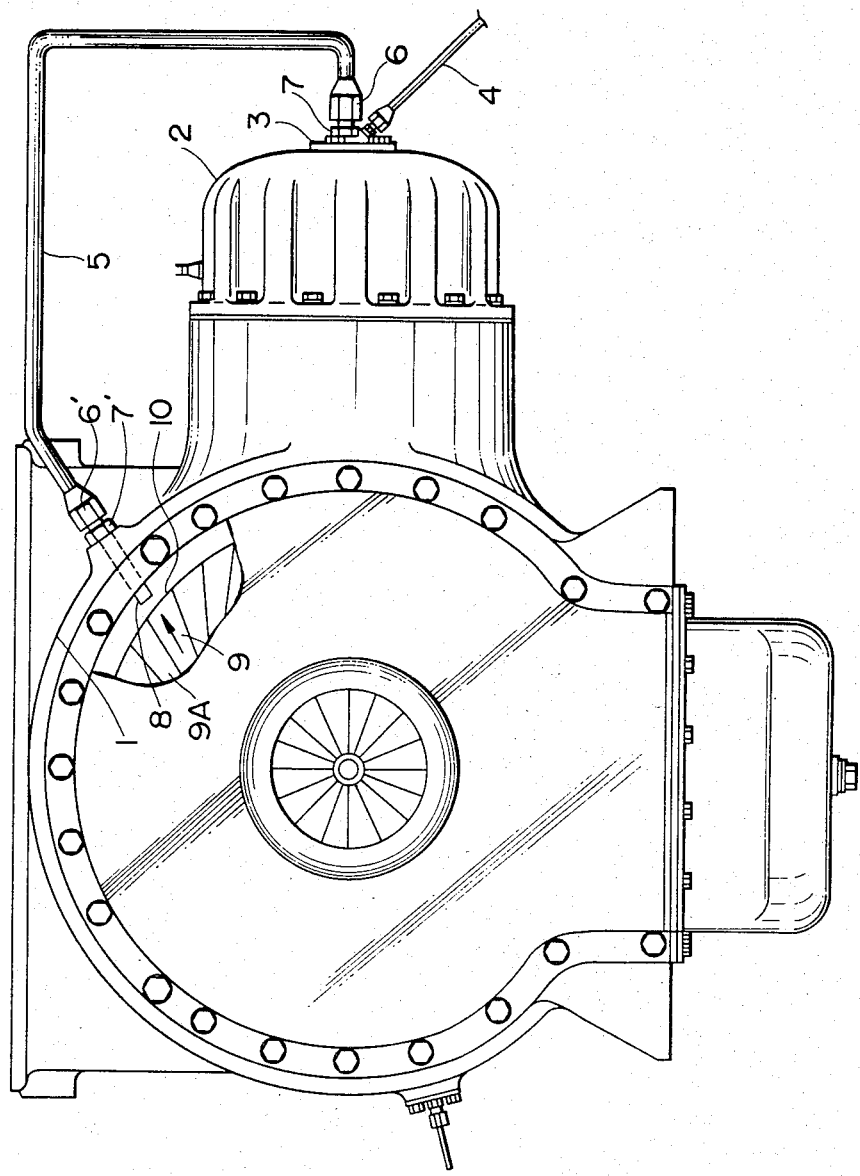
FIG. 1(A) is a front view showing a sample prior-art arrangement of the air passageway communicating with an air injection valve for a gas turbine engine.
Figure 1B:
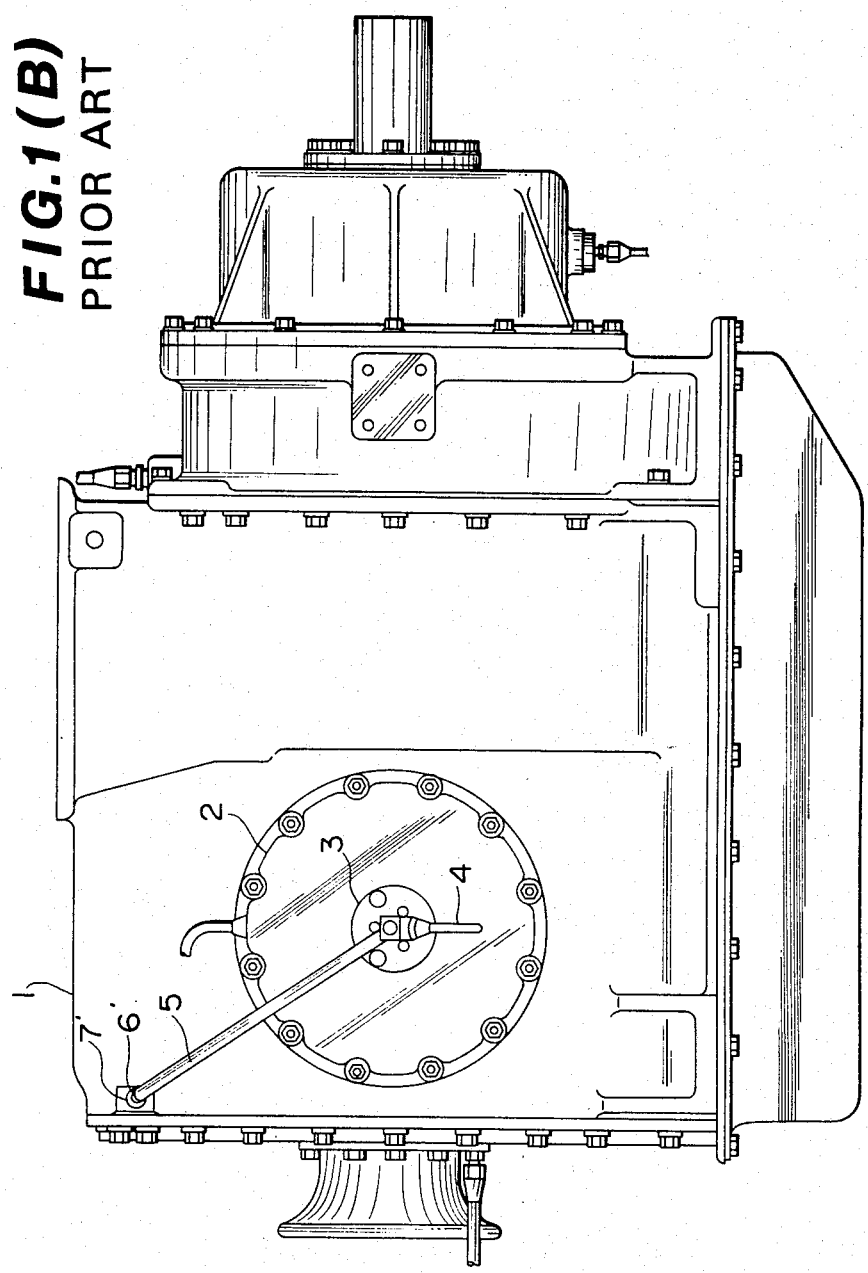
FIG. 1(B) is a side view showing the sample prior-art arrangement of the air passageway of FIG. 1.

In FIG. 1(A) and FIG. 1(B), a main housing 1 for a gas turbine engine is connected to a combustion chamber housing 2. In housing 2, an air injection valve 3 is disposed near the inlet of a fuel line 4 to atomize fuel entering the combustion chamber using compressed air fed through an air supply pipe 5.

An supply pipe 5 conducts air into air injection vlave 3, as shown in FIGS. 1(A) and (B), one end of which is connected to the air injection valve via a connector 6 and a nut 7, the other end being connected to an air outlet pipe 8 disposed within the main housing using another connector 6' and nut 7'. In this case, since air outlet pipe 8 is disposed to communicate with outlet port 10 of a diffuser 9 provided for the compressor within the gas turbine engine, the air compressed by the compressor is fed from the outlet port to the air outlet pipe by the force of diffuser 9, and further fed to the air injection valve through the pipe 5.

In the prior-art arrangement thus described, since air supply pipe 5 is disposed outside the gas turbine engine, to supply compressed air into air injection valve 3, there exist various shortcomings already described under Description of the Prior Art.

In view of the above description, reference is now made to a preferred embodiment of the air passageway according to the present invention, which communicates with an air injection valve for a gas turbine engine.

Figure 2:
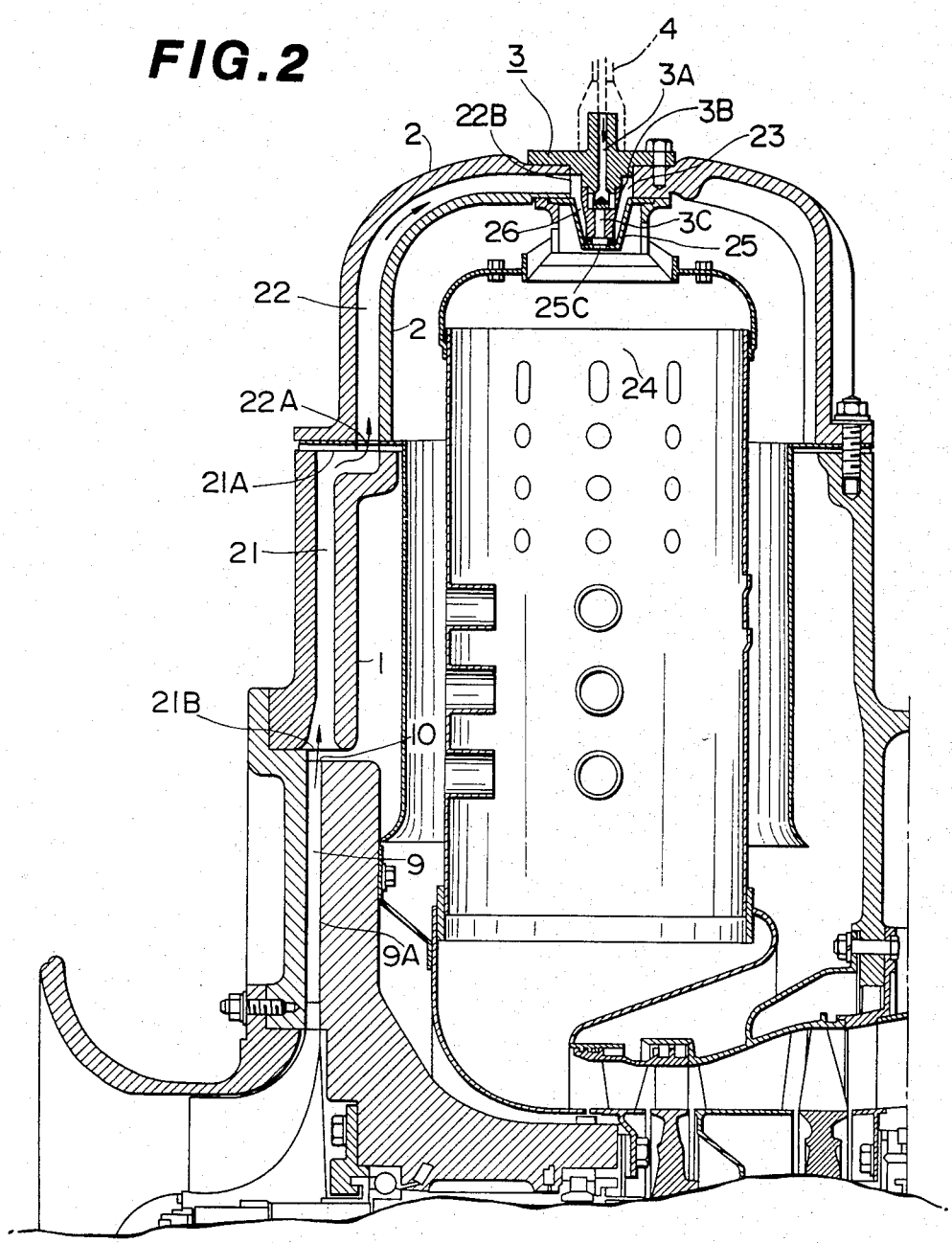
FIG. 2 is a longitudinal cross-sectional view showing an arrangement of the passageway according to the present invention communicating with an air injection valve for a gas turbine engine.

In FIG. 2, first and second air passageways 21 and 22, respectively, conduct air from the compressor into the air injection valve 3. First air passageway 21 is formed integrally with and within main housing 1 of the gas turbine engine by the method of core casting; second air passageway 22 is also formed integrally with and within combustion chamber housing 2 of the gas turbine engine by the method of core casting. Air passageways 21,22 are arranged so that when main housing 1 and combustion chamber housing 2 are connected together one end portion 21A of the first air passageway communicates with one end portion 22A of the second air passageway. The other end portion 21B (air intake port) of first air passageway 21 communicates with diffuser outlet 10 of the compressor; The other end portion 22B of second air passageway 22 communicates with a conical, annular air passageway 26 described hereinafter.

On top of combustion chamber housing 2, air injection valve 3 fits into an installation hole 23 formed in the combustion chamber housing.

Figure 3:
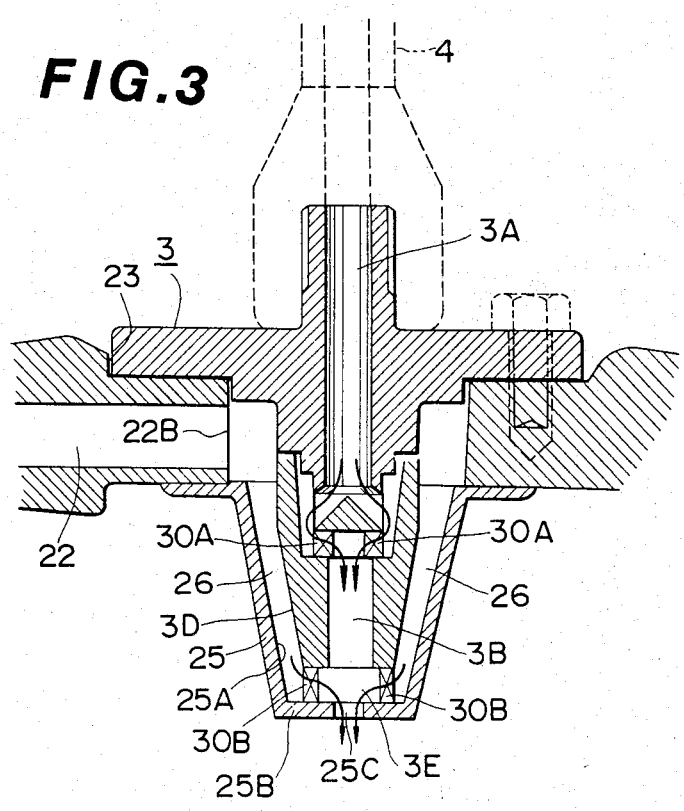
FIG. 3 is an enlarged detailed cross-sectional view showing the air injection valve to which the air passageway according to the present invention leads.

Now follows a detailed description of air injection valve 3 with reference to FIG. 3.

Air injection valve 3 comprises a first fuel passageway 3A, fuel whirling grooves 30A and a second fuel passageway 3B. Fuel flowing through fuel pipe 4 passes into second fuel passageway 3B via first fuel passageway 3A and first fuel whirling grooves 30A. When the fuel passes through grooves 30A, it is imparted with some angular momentum. Further, a truncated-cone-shaped member 25 is disposed projecting toward the inside of the combustion chamber to form a conical, annular air passageway 26 between inner peripheral wall 25A of the cone-shaped member and outer peripheral wall 3D of air injection valve 3. This conical, annular air passageway 26 communicates with second air passageway 22. Further, a fuel injection nozzle 25C is provided at bottom 25B of the truncated-cone-shaped member 25. Additionally, air whirling grooves 30B at bottom 3E of second fuel passage 3B connect passageway 26 with the bottom.

Figure 4:
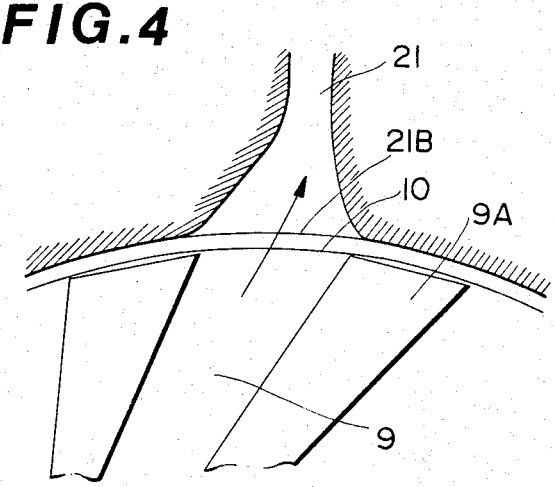
FIG. 4 is an enlarged detailed view in partial cross-section of the air inlet port of the passageway according to the present invention.

In the arrangement of the air passageways thus constructed according to the present invention, as shown in FIG. 4, high-speed and high-density air compressed by the compressor of the gas turbine engine first reaches the outlet port 10 through diffuser 9 partitioned by a plurality of diffuser vanes 9A.

In this case, the velocity of compressed air sent from the impeller under dynamic pressure is reduced as compressed air passes through the diffuser 9. In other words, almost all the dynamic pressure (kinetic energy) is converted into a static pressure (pressure energy), but part of the dynamic pressure remains at outlet port 10. Therefore, air is propelled through end portion 21B into first air passageway 21. Then, compressed air passes through second air passageway 22 and into the conical, annular air passageway 26 as shown in FIG. 3. Here, the total pressure (total energy) within conical, annular air passageway 26 is higher than that within combustion chamber 24. That is to say, as described hereinabove, since the dynamic pressure is not completely converted into the static pressure by diffuser 9, some part of the air flow energy is derived from dynamical pressure (kinetic energy). Therefore, some dynamical pressure exists even in conical, annular air passageway 26, and the pressure corresponding to the dynamical pressure in higher than that within the combustion chamber 24. Accordingly, the compressed air introduced into the conical, annular air passage 26 passes through the air whirling grooves 30B, and enters the bottom portion 3E of the air injection valve 3 in a high-speed whirling-stream state.

On other hand, at the bottom 3E of from fuel injection valve 3, from fuel supplied through from fuel pipe 4 exits the second fuel passageway 3B in a high-speed whirling stream state after the fuel passes through first fuel passageway 3A and first whirling grooves 30A. The fuel then encounters the whirling air stream at bottom 3E, and is thereby atomized and injected into the combustion chamber through fuel nozzle 25C.

The air sent from the compressor is thus supplied to air injection valve 3, as explained above, through first air passageway 21 formed integrally with the main housing 1 and second air passageway 22 formed integrally with combustion chamber housing 2.

Further, in the air passageways according to the present invention, it is also preferable to form air passageways 21 and 22 from a pipe implanted within each of main housing 1 and combustion chamber housing 2. When pipes are used to form passageways 21,22 no hollow cavities forming the passageways are necessary within the housings, eliminating the use of casting cores.

Further, when casting the housings, if air inlet port 21B of first air passageway 21 is formed funnel shaped as in FIG. 4, it is possible to introduce air fed from diffuser 9 into the first passageway more efficiently.

As described above, in the air passageways communicating with the air injection valve according to the present invention, since the air passageways for conducting air from the compressor to the air injection valve are formed integrally with the main housing and the combustion chamber housing, it is possible to increase the cross-sectional area of the air passageways to any given value, regardless of the layout of the gas turbine engine and other apparatus, and to shorter the length of the air passageway from the compressor to the air injection valve, thus reducing energy loss during flow of air from the compressor to the air injection valve to conduct air to the air injection valve efficiently.

Further, since the second air passageway is formed integrally with the combustion chamber housing, and therefore since the air passing therethrough is heated, it is possible to enhance combustion efficiency.

As a result, under any operating conditions, including when the gas turbine engine is started, it is possible to inject fuel satisfactorily using only pressure provided by the gas turbine engine compressor.

In addition, since there are no need for providing an air intake pipe, an air supply pipe, connectors, nuts, etc., near the gas turbine engine, it is possible to reduce manufacturing steps, and therefore manufacturing cost.

It will be understood by those skilled in the art that the foregoing description is in terms of preferred embodiments of the present invention wherein various changes and modifications may be made without departing from the spirit and scope of the invention, as is set forth in the appended claims.

What is claimed is:

1. In a gas turbine engine in which the air compressed by a compressor provided therein is supplied into a combustion chamber through an air injection valve, the improvement which comprises:
 (a) a main housing provided with a first air passageway of generally circular cross section integrally formed within and extending through a single main housing wall between inner and outer surfaces thereof;
 (b) a combustion chamber housing provided with a second air passageway of generally circular cross section integrally formed within and extending through a single combustion chamber housing wall between inner and other surfaces thereof, said combustion chamber housing being connected to said main housing with one end of the first air passageway and one end of the second air passageway communicating with each other, the other end of the first air passageway communicating with the compressor and the other end of the second air passageway communicating with the air injection valve, wherein a portion of the second air passageway leading into the other end of said second air passageway is gently curved to follow the contour of the combustion chamber housing wall so that the mouth of said other end of the second air passageway leading into the air injection valve is generally orthogonal to the mouth of said one end of the second air passageway, said first and second air passageways thereby defining a smoothly curved and generally direct, nontortuous air flow path between the compressor and injection valve.

2. A gas turbine engine as set forth in claim 1, further including a pipe implanted within the main housing wall to define the first air passageway therewithin.

3. A gas turbine engine as set forth in claim 1, further including a pipe implanted within the combustion chamber housing to define the second air passageway therewithin.

4. A gas turbine engine as set forth in claim 1, wherein the end of the first air passageway communicating with the compressor is formed in a funnel shape so that air is efficiently fed from the compressor into the first air passageway, the diameter of the funnel portion being larger than the diameter of the first air passageway.

5. The gas turbine engine of claim 1, wherein said air injection valve includes a conical, annular air passageway communicating with said other end of the second air passageway to supply compressed air to air whirling grooves formed within said valve.

6. In a gas turbine engine including a fuel injection valve with whirling grooves, in which air compressed by a compressor provided therein is supplied into a combustion chamber through an air injection valve, the improvement which comprises:
(a) a main housing having a main housing wall provided with a core casted tubular hollow conduit establishing a first air passageway integrally formed within and extending through the main housing wall between inner and outer surfaces thereof;
(b) a combustion chamber housing having a combustion chamber housing wall provided with a core casted tubular hollow conduit establishing a second air passageway integrally formed within and extending through the combustion chamber housing wall between inner and outer surfaces thereof, said combustion chamber housing being connected to said main housing with one end of the first air conduit and one end of the second air conduit communicating with each other, the other end of the first conduit communicating with the compressor and the other end of the second conduit communicating with the air injection valve.

7. A gas turbine engine as set forth in claim 6, further including a separate metal pipe implanted within the main housing wall to define the first conduit therewithin.

8. A gas turbine engine as set forth in claim 6, further including a separate metal pipe implanted within the combustion chamber housing wall to define the second conduit therewithin.

9. A gas turbine engine as set forth in claim 6, wherein the end of the first conduit communicating with the compressor has a funnel shape so that air is efficiently fed from the compressor into the first conduit, the diameter of the funnel portion being larger than the diameter of the first air conduit.

* * * * *